United States Patent [19]

Lee

[11] 4,312,584
[45] Jan. 26, 1982

[54] SHUTTER ACTUATING MECHANISM FOR PHOTOGRAPHIC CAMERA

[75] Inventor: J. Kelly Lee, Rochester, N.Y.

[73] Assignee: Eastman Kodak Company, Rochester, N.Y.

[21] Appl. No.: 125,311

[22] Filed: Feb. 27, 1980

[51] Int. Cl.³ ............................................. G03B 17/38
[52] U.S. Cl. .................................... 354/266; 354/288
[58] Field of Search ............... 354/267, 268, 269, 266, 354/288

[56] References Cited

U.S. PATENT DOCUMENTS

| 612,476 | 10/1898 | Atwater | 354/266 |
|---|---|---|---|
| 975,497 | 11/1910 | Becker | 354/269 |
| 975,602 | 10/1910 | Becker | 354/269 |
| 1,298,723 | 4/1919 | Hurlburt . | |
| 1,308,991 | 7/1919 | Parkinson et al. . | |
| 2,171,529 | 9/1939 | Baldwin et al. . | |

FOREIGN PATENT DOCUMENTS

| 168573 | 6/1951 | Austria | 354/269 |
|---|---|---|---|
| 2011816 | 3/1970 | Fed. Rep. of Germany . | |
| 30 | of 1904 | United Kingdom | 354/269 |
| 1182782 | 3/1970 | United Kingdom . | |

Primary Examiner—Russell E. Adams
Attorney, Agent, or Firm—Thomas H. Close

[57] ABSTRACT

Disclosed herein is a shutter actuating mechanism for a photographic camera. The mechanism comprises a pair of spaced members adapted to be engaged by the thumb and forefinger of the camera user, and a resilient member positioned therebetween. A pinching or squeezing movement between the finger thumb and forefinger causes the spaced members to move toward each other, thereby producing a displacement of the resilient member. Such displacement of the resilient member produces a force which is used to actuate a shutter. Preferably, the spaced members, the resilient member and a plurality of coupling hinges comprise a one piece plastic structure having a constant transverse cross section, whereby the shutter actuating mechanism can be produced by conventional extrusion techniques.

2 Claims, 5 Drawing Figures

SHUTTER ACTUATING MECHANISM FOR PHOTOGRAPHIC CAMERA

BACKGROUND OF THE INVENTION

This invention relates to photographic cameras and, more particularly, to improvements in shutter actuating mechanisms.

In virtually all photographic still cameras of the type designed to be hand-held during use, the shutter actuating mechanism is positioned either on the top or front sides of the camera housing in a position to be depressed, and thereby actuated, by the forefinger of the camera operator. Ideally, movement of the shutter actuating mechanism should be effected without imparting any movement to the camera housing; otherwise, the subject matter being photographed will not be framed as intended or, worse yet, the image thereof will be smeared. Unfortunately, this ideal is often difficult to realize inasmuch as the shutter actuating mechanism in all cameras is spaced some distance from the center of gravity of the camera. Thus, during depression of the shutter actuator a torque or twisting moment is exerted on the camera housing which, depending on the position of the shutter actuator relative to the center of gravity of the camera, tends to produce pitch, roll and/or yaw movements of the camera.

In published German Patent Application DT-OS No. 2,011,816 filed on Mar. 12, 1970 in the name of Leczkowski, there is disclosed a shutter actuating mechanism which comprises a pair of depressable buttons mounted on opposite sides of a camera housing. These buttons are positioned in an opposing relationship and are adapted to be engaged by the thumb and forefinger of the photographer. Actuation of the shutter is effected by moving the two buttons toward each other, as is effected by a pinching action of the thumb and forefinger. As the buttons move toward each other, one button acts to close a switch and thereby electrically energize an electromagnetic release. The other button acts to initiate movement of the shutter after it is released for movement by the first button. Due to the opposing physical relationship of the buttons, the force required to move one button is reacted by an equal and opposite force applied to the other, and, as the shutter release is actuated, the net torque or moment about the center of gravity of the camera housing is zero.

While the concept disclosed in the above German application is a good one, the apparatus disclosed for implementing it is relatively complex, and hence, expensive in that it employs electrical, mechanical and electromagnetic components.

SUMMARY OF THE INVENTION

It is an object of the present invention to provide a simple, low cost shutter actuating mechanism which, when operated, exerts substantially no torque or twisting moments which would tend to cause the camera housing to pitch, roll or yaw about its center of gravity.

According to the present invention, there is provided a shutter actuating mechanism comprising a pair of spaced members which are interconnected by a resilient member. When properly positioned on the camera housing, the spaced members are located to be engaged by the thumb and a finger of the photographer and, as these members are mutually moved toward each other (e.g. by a pinching action by the photographer's thumb and forefinger), they exert a force on the resilient member, causing it to move, preferably in a direction which is generally perpendicular to the direction of movement of the spaced members. As the resilient member moves, it actuates a shutter, such as, for example, by releasing a mechanical latch. Upon removing the force applied to the spaced members, the resilient member urges the spaced members to their initial position. Preferably, the resilient member and the spaced members are integrally formed, such as by a plastic injection molding or extrusion technique.

Other objects and advantages of the invention will be apparent from the ensuing description of a preferred embodiment, reference being made to the accompanying drawings.

DETAILED DESCRIPTION OF PREFERRED EMBODIMENTS

Figure 1:
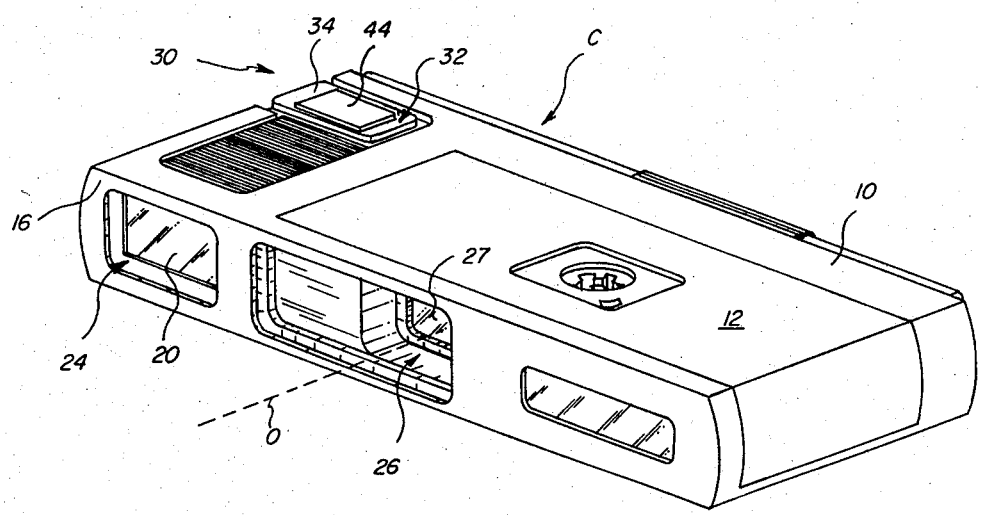
FIGS. 1 and 2 are perspective views of a camera incorporating a shutter actuating mechanism structured in accordance with a preferred embodiment of the invention.
Figure 2:
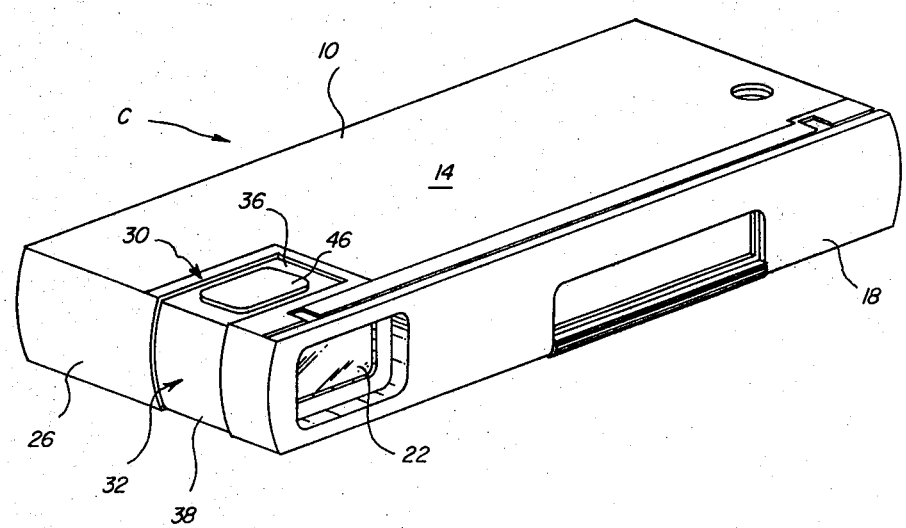

Referring now to FIGS. 1 and 2, there is shown a photographic still camera C incorporating a preferred embodiment of the shutter actuating mechanism of the invention. The particular camera shown is the size 110 camera made by Eastman Kodak Company. Since the structure and components of photographic still cameras of the type in which the invention has particular utility are well known, only that structure and those components which cooperate directly with the invention are described herein.

Figure 3:
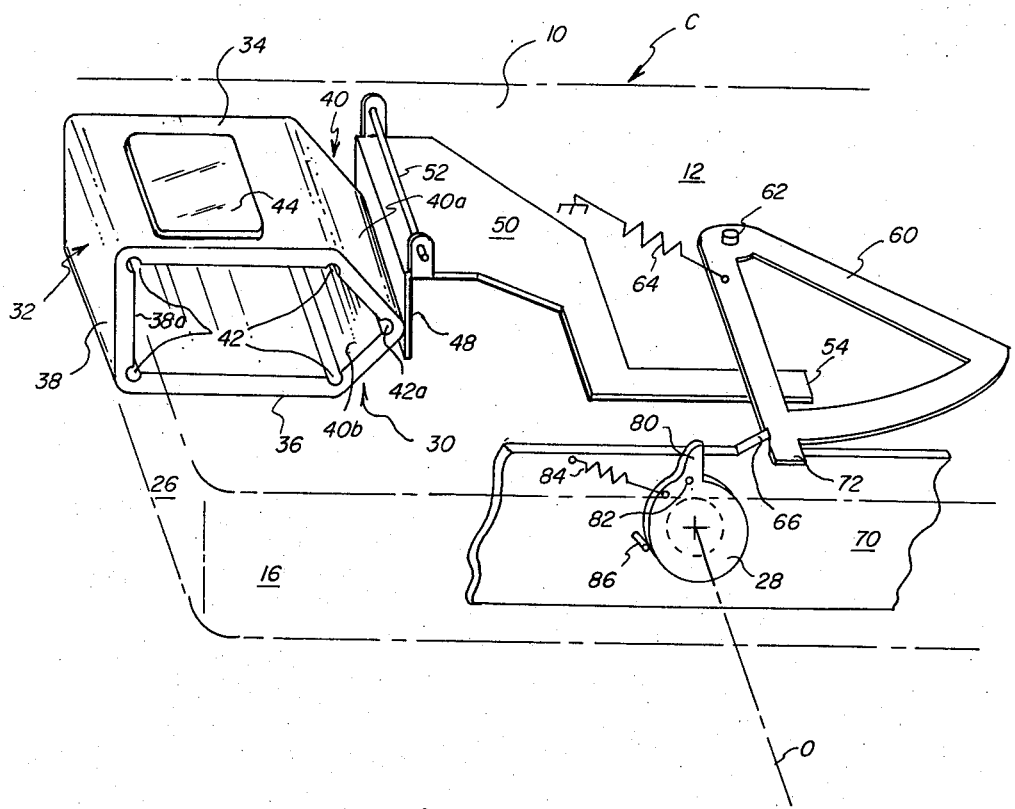
FIG. 3 is a perspective view of a preferred embodiment of the invention shown as it cooperates with a conventional shutter mechanism.

Camera 10 basically comprises a relatively thin, rectangular housing 10 having top and bottom sides, 12 and 14, respectively. The housing's front and rear sides, 16 and 18, respectively, are provided with rectangular apertures for receiving the optical elements 20 and 22 of a conventional viewfinder 24. Mounted in a recessed portion 26 of the camera housing's front side 16 is an objective lens 27 for forming an image of an object to be photographed at a film plane. A movable shutter blade 28, shown in FIG. 3, is positioned on the optical axis O of the objective lens to control the exposure of a photographic film positioned at the film plane.

Mounted to an end wall 26 of the camera housing in the vicinity of the viewfinder is a shutter actuating mechanism 30 which is structured in accordance with a preferred embodiment of the present invention. As best shown in FIG. 3, shutter actuating mechanism 30 comprises a compressible, open-ended, box-like member 32 having upper and lower platforms 34 and 36, respectively, which are connected by a substantially rigid side wall 38 and a substantially flexible side wall 40. Both of the side walls are connected to the upper and lower platforms 34 and 36 by means of hinges 42; further, side wall 40 is provided with a hinge 42a which extends along the longitudinal center line thereof, dividing this side wall into upper and lower halves, 40a and 40b, respectively, thereby rendering side wall 40 substantially flexible. Hinge 42 is adapted to exert a force on the upper and lower halves of side wall 40 which resiliently urges these halves toward their respective positions shown in FIG. 3 and 4, i.e. to positions which maintain platforms 34 and 36 substantially parallel. Preferably, mechanism 30 is a one-piece structure, as may be made from an extrusion or injection molding process, and is made of plastic, such as polyethylene. When fabricated as a one-piece structure, upper and lower platforms 34 and 36, side walls 38 and 40, and hinges 42 and 42a are integral parts of the one-piece structure. Hinges 42 are formed by merely reducing the wall thickness along the lines at which the side walls bend to form the upper and lower platforms. Hinge 42a is formed in a similar manner by selectively reducing the thickness of side wall 40.

When the shutter actuating mechanism of the invention is installed in the camera housing, the inside surface 38a of side wall 38 is mounted to a recessed portion of end wall 26 by an adhesive or the like. The spacing between the upper and lower platforms 34 and 36 is such that the exposed outer surfaces thereof are substantially co-planar with the top and bottom sides of the camera housing. Preferably, the dimensions of the upper and lower platforms and the interconnecting side walls are selected so that the opening 43 (see FIGS. 4A and 4B) defined by these members is sufficiently large to encompass the viewfinder optics and not interfere with the optical path of the viewfinder. Preferably, a pair of resilient pads 44, 46 are provided on the exposed surfaces of platforms 34 and 36, respectively, to be engaged by the forefinger and thumb of the camera user.

Figure 4A:
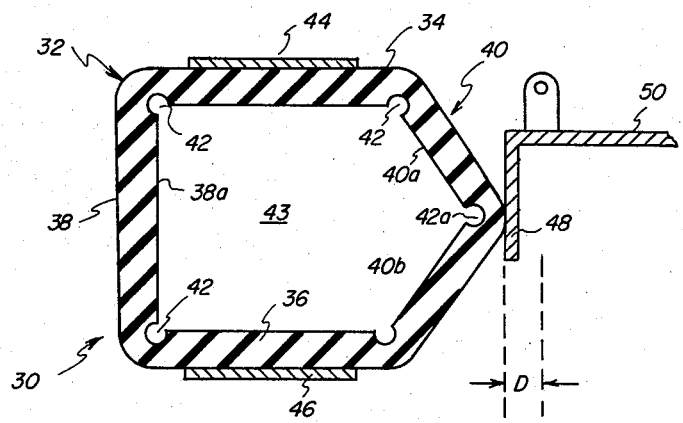
FIGS. 4A and 4B are transverse cross-sectional views taken along the section line 4—4 in FIG. 3 showing a preferred shutter actuating mechanism in non-operating and operating states, respectively.
Figure 4B:
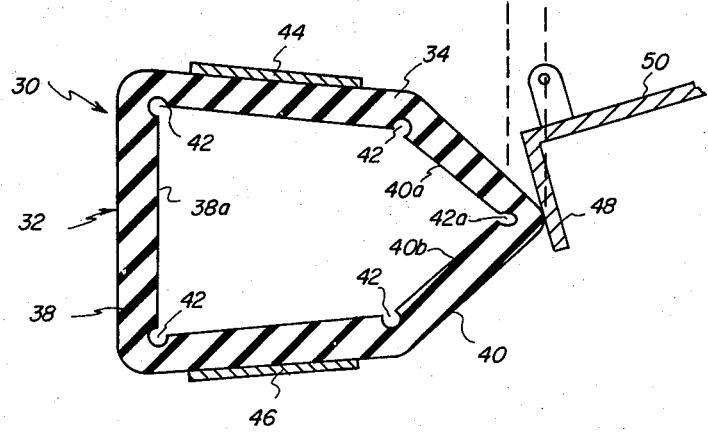

In operation, the camera user pinches platforms 34 and 36 toward each other, thereby pivoting the two halves of side wall 40 about hinge 42a toward each other to buckle side wall 40 outwardly. FIGS. 4A and 4B show the cross-sectional shape of the shutter actuating mechanism before and after pressure is applied to platforms 34 and 36. As shown, pressure applied to platforms 34 and 36 causes wall 40 to buckle outwardly, thereby producing a lateral displacement D of the side wall 40. This lateral displacement produces a force on a flange 48 of an L-shaped member 50, causing the L-shaped member to pivot counterclockwise about a pivot pin 52. Such counterclockwise rotation of member 50 causes the free end 54 thereof to unlatch a high energy sector-shaped member 60 from a latched position. Note, because the distance between pivot pin 52 and the line along which wall 40 contacts flange 48 is substantially less than the distance between pivot pin 52 and the free end 54 of L-shaped member 50, member 50 serves to amplify displacement D. Sector-shaped member 60 is pivotally mounted about a pin 62 and is spring biased by spring 64 for rotation in a clockwise direction, as viewed in FIG. 3. The sector-shaped member is maintained in a latched position, as shown in FIG. 3, by a latch 66 extending from an upper edge of a mechanism plate 70 of the camera. Clockwise rotation of the sector-shaped member 60 causes an extension 72 thereof to impact a tab 80 extending from shutter blade 28. The shutter blade is pivotally mounted to the mechanism plate by pin 82 and urged by spring 84 to a rest position against stop 86. Upon being impacted by the sector-shaped member, the shutter blade pivots counterclockwise about its pivot pin, thereby opening the shutter. Spring 84 acts to return the shutter to the closed position, as shown, after an exposure has been made. Upon reducing the pressure applied to platforms 34 and 36, the resilient side wall 40 urges these members toward their initial parallel relationship, as shown in FIG. 4.

From the foregoing description, it will be appreciated that the shutter actuating mechanism of the invention is extremely simple in construction and, hence, highly reliable in operation. Since its transverse cross section is constant over its length, it is readily extrudable and therefore lends itself to low-cost mass production. Also, owing to its open-ended nature, it can be installed in the viewfinder portion of many still cameras so that viewfinding is effected "through" it. Further, since shutter actuating is effected by a squeezing together of two spaced members positioned on opposite sides of the camera, the net torque on the camera housing is zero; thus, image-smearing is minimized.

While the invention has been described with particular reference to a compressible, one-piece shutter actuating mechanism, it should be appreciated that many multi-element variations will suggest themselves to those skilled in the art. For instance, the box-like member 32 could be formed by a pair of spaced planar members between which a resilient tubular member (e.g. a cylindrical rubber tube) is positioned. Upon squeezing the planar members toward each other, the tubular member will be displaced in a perpendicular direction. Such displacement would then be used to actuate the shutter mechanism shown in FIG. 3.

The invention has been described in detail with particular reference to certain preferred embodiments thereof, but it will be understood that variations and modifications can be effected within the spirit and scope of the invention.

I claim:

1. In a camera having a substantially rectangular housing with top and bottom sides, end walls, and front and rear sides with apertures for accommodating the optical path of a viewfinder, a shutter actuating mechanism, comprising:

a compressible, open ended, box-like member having upper and lower platforms connected by one substantially rigid side wall, and one substantially flexible side wall, said substantially flexible side wall being adapted to buckle outwardly in response to pressure being applied to said upper and lower platforms;

means for securing said substantially rigid side wall of said box-like member to an end wall of said camera housing such that said upper and lower platforms are substantially coplanar with said top and bottom sides of said camera housing and are accessible through openings provided in the top and bottom sides of said camera, and such that said open ended box-like member surrounds the optical path of the viewfinder; and shutter latch means disposed in the path of said outwardly buckling flexible side wall and adapted to receive a latch releasing force from said side wall in response to pressure being applied to said upper and lower platforms.

2. The invention claimed in claim 1, wherein: said compressible open ended, box-like structure is formed in one piece from plastic, said upper and lower platforms being connected to said side walls by hinges comprising reduced thickness portions of the plastic piece, and said flexible side wall including such a hinge near the middle thereof.

* * * * *

UNITED STATES PATENT AND TRADEMARK OFFICE
CERTIFICATE OF CORRECTION

PATENT NO. : 4,312,584
DATED : January 26, 1982
INVENTOR(S) : J. Kelly Lee

It is certified that error appears in the above-identified patent and that said Letters Patent are hereby corrected as shown below:

On cover page under Abstract, line 6, please delete "finger".

Column 3, line 4, please delete "and 4".

Signed and Sealed this

Twenty-second Day of June 1982

[SEAL]

Attest:

*Attesting Officer*

GERALD J. MOSSINGHOFF

*Commissioner of Patents and Trademarks*